United States Patent [19]

Kuragano et al.

[11] Patent Number: 4,866,631
[45] Date of Patent: Sep. 12, 1989

[54] METHOD FOR GENERATING OFFSET SURFACE DATA

[75] Inventors: Tetsuzo Kuragano, Tokyo; Nobuo Sasaki, Kanagawa, both of Japan

[73] Assignee: Sony Corporation, Tokyo, Japan

[21] Appl. No.: 110,503

[22] Filed: Oct. 19, 1987

[30] Foreign Application Priority Data

Oct. 21, 1986 [JP] Japan .................................. 61-250186
Mar. 5, 1987 [JP] Japan .................................. 62-50839

[51] Int. Cl.⁴ ............................................ G06F 7/38
[52] U.S. Cl. .......................... 364/474.29; 364/474.31; 364/720
[58] Field of Search .............. 364/474.05, 474.25, 364/474.31, 474.29, 132, 718–722, 723, 474.06, 474.01, 474.03; 219/69 M, 69 W; 340/728, 732, 736, 720

[56] References Cited

U.S. PATENT DOCUMENTS

| | | | |
|---|---|---|---|
| 3,524,049 | 8/1970 | Gotz et al. | 364/720 X |
| 3,634,667 | 1/1972 | Okamato et al. | 364/720 X |
| 3,809,868 | 5/1974 | Villalobos et al. | 364/720 X |
| 3,882,304 | 5/1975 | Walters | 364/132 X |
| 3,917,932 | 11/1975 | Saita et al. | 364/720 X |
| 4,031,369 | 6/1977 | Heaman et al. | 364/474.31 |
| 4,355,223 | 10/1982 | Inoue et al. | 219/69 W |
| 4,423,481 | 12/1983 | Reid-Green et al. | 364/74.31 |
| 4,445,182 | 4/1984 | Morita et al. | 364/474.25 |

Primary Examiner—A. D. Pellinen
Assistant Examiner—A. Jonathan Wysocki
Attorney, Agent, or Firm—Philip M. Shaw, Jr.

[57] ABSTRACT

A method for generating offset surface data representing a tool path of a tool traversing patches which are mutually adjoining at boundary lines where there is no continuity of the osculating planes. The offset surface data is interpolated for the parts of the surface at which the offset surface data become mutually discontinuous at the boundary lines or for a patch having a sharp corner. The present invention is applicable to a NC (Numerical Control) machining center which can control a machine tool so as to prevent excessive milling by the tool at the discontinuous parts of the offset surface.

10 Claims, 14 Drawing Sheets

METHOD FOR GENERATING OFFSET SURFACE DATA

BACKGROUND OF THE INVENTION

1. Technical Field

The present invention relates to a method for generating offset surface data. The present invention is particularly applicable, but not exclusively, to a method for generating offset surface data in order to manufacture a contoured product using data representing a free surface generated through, e.g., a CAD (Computer Aided Design) or CAM (Computer Aided Manufacturing) method.

2. Background Art

In the case where the contour of the object described by the free surface is designed using, e.g., CAD technique (so called, geometric modeling), the designer generally specifies a plurality of points (articulation points) in a three dimensional space through which the surface is to pass and uses a computer to calculate a boundary line network interconnecting the plurality of specified articulation points on the basis of desired vector functions. A surface represented by a 37 wire frame" is thus generated. In this way, a multiple number of framed spaces enclosed with boundary lines can be formed. Such processing is called frame processing.

The boundary line network formed through the above-described frame processing represents a rough sketch to be designed by the designer. If a surface which can be represented by predetermined vector functions using boundary lines enclosing each framed space can be interpolated, the free surface desired by the designer (which is impossible to specify by means of a quadratic function) can, as a whole, be generated.

The surface extended over each framed space forms a basic element constituting the whole surface and is called a "patch".

To provide a more natural outer contour for the generated entire free surface, a free surface generating method has been proposed in which a control side vector around a common boundary is set again so as to extend a patch to satisfy the condition of continuity of the osculating planes at the common boundary bridging the two frame spaces.

A Japanese Patent Application Non-Examined Publication No. Sho 62-135965 published on June 18, 1987 exemplifies the above-described free surface generating method.

The free surface generating method disclosed in the above-identified Japanese Patent Application Publication will be described below with reference to FIGS. 1 to 6 of this application.

In the case where two patches $S_{(u,v)1}$ and $S_{(u,v)2}$ are smoothly connected to each other, e.g., as shown in FIG. 1, control side vectors $a^1$, $a^2$, $c^1$, and $c^2$ so as to establish a condition of continuity of the osculating planes are, in principle, set on a common boundary COM 12 bridging adjoining patches $S_{(u,v)1}$ and $S_{(u,v)2}$ on the (basis of articulation points $P_{(00)}$, $P_{(30)1}$, $P_{(33)1}$, $P_{(03)}$, $P_{(33)2}$, and $P_{(30)2}$ derived through the frame processing internal control points $P_{(11)1}$, $P_{(12)1}$, $P_{(11)2}$, and $P_{(12)2}$ are set once again by means of these control side vectors.

If the above-described technique is applied to other common boundaries, the two patches $S_{(u,v)1}$ and $S_{(u,v)2}$ can be smoothly connected to other adjoining patches under the condition of continuity of the osculating planes. It is noted that "osculating plane" means a plane formed by tangent vectors in the u and v directions at each point of the common boundary. For example, when at each point on the common boundary COM 12 of FIG. 1, the osculating planes of the patches $S_{(u,v)1}$ and $S_{(u,v)2}$ are the same, the "condition of continuity of the osculating planes" is established.

In detail, the condition of continuity of the osculating planes at a point (o, v), wherein u=o, v=v, on the common boundary COM12, is determined as shown in FIG. 2. That is to say, for the one patch $S_{(u,v)1}$ a normal vector n1 for a tangent vector Ha in a direction traversing the common boundary COM12 (i.e., u direction) and a tangent vector Hb in a direction along the common boundary COM12 (i.e., v direction) can be expressed in the following equation:

$$n_1 = H_a \times H_b \qquad (1)$$

In addition, for the other patch $S_{(u,v)2}$ a normal vector n2 for a tangent vector Hc in a direction traversing the common boundary COM12 and a tangent vector Hb in a direction along the common boundary COM12 can be expressed in the following equation:

$$n_2 = H_c \times H_b \qquad (2)$$

Since the two sets of tangent vectors Ha and Hb, and Hc and Hb must be present on the same planes, respectively, to establish the condition of continuity of the osculating planes under such a condition as described above, the two normal vectors n1 and n2 are consequently directed in the same sense.

To achieve this condition for the two normal vectors n1 and n2, the internal control points $P_{(11)1}$, $P_{(21)1}$, $P_{(12)1}$, $P_{(22)1}$ and $P_{(11)2}$, $P_{(21)2}$, $P_{(12)2}$, $P_{(22)2}$ may be set so as to establish the following equation:

$$\lambda(v) \frac{\partial S_{(u,v)2}}{\partial u} = \mu(v) \frac{\partial S_{(u,v)1}}{\partial u} + \nu(v) \frac{\partial S_{(u,v)1}}{\partial v} \qquad (3)$$

In the equations (3), $\lambda(v)$, $\mu(v)$, and $\nu(v)$ denote scalars.

Furthermore, the patches $S_{(u,v)1}$ and $S_{(u,v)2}$ are represented using a vector function $S_{(u,v)}$ of a cubic Bezier equation:

$$S_{(u,s)} = (1-u+uE)^3 (1-v+vF)^3 P_{(00)} \qquad (4)$$

It is noted that u and v denote parameters in the u direction and in the v direction and E and F denote shift operators.

It is also noted that a control point used in the description includes the articulation point and control point, each representing a boundary line in the framed space, and the internal control point representing the surface inside the patch.

Suppose that a product having a contour represented by the surface data on the multiple number of patches $S_{(u,v)}$ generated under the above-described technique is milled using, e.g., a milling machine of an NC (Numerical Control) machine tool. In this case, offset surface data $S_{(u,v)OFF}$ corresponding to a single patch $S_{(u,v)}$ is defined by the following equation:

$$S_{(u,v)\ OFF} = S_{(u,v)} + R \times n_{(u,v)} \qquad (5)$$

The center of the tool of a milling machine may be supposed to move through a position expressed by the offset surface data $S_{(u,v)OFF}$.

The above equation (5) represents the generation of the offset surface data $S_{(u,v)OFF}$ constituted by a plane translated in the normal direction by a translation operation variable expressed by $Rxn_{(u,v)}$ with respect to position data representing a surface of the patch $S_{(u,v)}$ which is a target to be milled. It is noted that R denotes the distance from the center position of the tool to the edge of a blade of the tool.

As shown in FIG. 4, the offset surface data $S_{(u,v)OFF}$ expressed by the equation (5) is supplied to a control unit of the machine tool, so that the tool is moved on a free surface expressed by the offset surface data S(u,v)-OFF. Consequently, the blade edge moves on a surface parallel to the offset surface data $S_{(u,v)OFF}$. Finally, the tool can mill the surface expressed by the patch S patch $S_{(u,v)}$.

In general, as described above with reference to FIG. 1, part of the contour surface of the product formed by sequentially connecting the two square patches $S_{(u,v)1}$ and $S_{(u,v)2}$ can easily be milled using the offset surface data $S_{(u,v)OFF}$.

In detail, the offset surface data $S_{(u,v)OFF1}$ and S(u,v)OFF2 derived on the basis of the mutually adjoining two patches $S_{(u,v)1}$ and S(u,v)2 are expressed as follows:

$$S_{(u,v)OFF1} = S_{(u,v)1} + Rxn_{(u,v)1} \quad (6)$$

$$S_{(u,v)OFF2} = S_{(u,v)2} + Rxn_{(u,v)2} \quad (7)$$

In the case as described above with reference to FIG. 1, if the mutually adjoining patches $S_{(u,v)1}$ and $S_{(u,v)2}$ are interconnected under the condition of continuity of the osculating planes, the normal vectors $n_{(n,v)1}$ and $n_{(u,v)2}$ coincide with each other at the position of the common boundary COM12. The translation data $Rxn_{(u,v)1}$ and $Rxn_{(u,v)2}$ (equations (6) and (7)) supplied during the milling operation become equal to each other. Consequently, the tool can continue the milling operation, smoothly passing through the boundary position under the same condition as the milling operation for the surfaces of the patches $S_{(u,v)1}$ and $S_{(u,v)2}$.

However, as shown in FIGS. 5 and 6, in the case where, e.g., the tool mills a corner of the object to be milled, mutually adjoining two or three patches $S_{(u,v)1}$ and $S_{(u,v)2}$, and/or $S_{(u,v)3}$ are connected in a discontinuous state in which the condition of continuity of the osculating planes is not established on the common boundaries COM12, COM23, and COM31. The offset surface data $S_{(u,v)OFF1}$, $S_{(u,v)OFF2}$, and/or $S_{(u,v)OFF3}$ positions of the common boundaries COM12, COM23, and COM31 are broken off in the vicinity of the positions of the common boundaries COM12, COM23, and COM31. Consequently, a discontinuous space is generated in the vicinity of the above-described positions.

In FIG. 6, $P_{CON12}$, $P_{CON23}$, and $P_{CON31}$ denote control points representing the patches $S_{(u,v)1}$ and $S_{(u,v)2}$, and $S_{(u,v)3}$, respectively. The offset surface data $S_{(u,v)OFF1}$, $S_{(u,v)OFF2}$, and $S_{(u,v)OFF3}$ for the three patches $S_{(u,v)1}$ and $S_{(u,v)2}$, and $S_{(u,v)3}$ on these three control points can be calculated using the following equations:

$$S_{(u,v)OFF1} = S_{(u,v)1} + Rxn_{(u,v)1} \quad (8)$$

-continued
$$S_{(u,v)OFF2} = S_{(u,v)2} + Rxn_{(u,v)2} \quad (9)$$

$$S_{(u,v)OFF3} = S_{(u,v)3} + Rxn_{(u,v)3} \quad (10)$$

In this way, the positional data $P_{OFF1}$, $P_{OFF2}$, and $P_{OFF3}$ are calculated representing the offset surface data $S_{(u,v)OFF1}$, $S_{(u,v)OFF2}$, and $S_{(u,v)OFF3}$ corresponding to the control points $P_{CON12}$, $P_{CON23}$, $P_{CON31}$.

When, in these calculations, the normal line vectors at points on the common boundaries COM12, COM23, and COM31, corresponding to control points $P_{(0)123}$, $P_{(1)12}$ to $P_{(4)12}$, $P_{(1)23}$ to $P_{(4)23}$, $P_{(1)31}$ to $P_{(4)31}$ representing the common boundaries COM12, COM23, and COM31, have different values in the patches $S_{(u,v)1}$, $S_{(u,v)2}$, and $S_{(u,v)3}$, the portional data $P_{(1)123}$, $P_{(11)12}$ to $P_{(41)12}$ and $P_{(02)123}$, $P_{(12)21}$ to $P_{(42)21}$ on the offset surface data $S_{(u,v)OFF1}$ and $S_{(u,v)OFF2}$ derived on the basis of calculations using the equations (8), (9) and (10) represent mutually different positions according to the values of the normal line vectors described above. In addition, the positional data $P_{(02)123}$, $P_{(12)23}$ to $P_{(42)23}$ and $P_{(03)123}$, $P_{(13)32}$ to $P_{(43)32}$ on the surface data $S_{(u,v)OFF2}$ and $S_{(u,v)OFF3}$ represent mutually different positions. Furthermore, the positional data $P_{(03)123}$, $P_{(13)31}$ to $P_{(43)31}$ and $P_{(01)123}$, $P_{(11)13}$ to $P_{(41)13}$ on the surface data $S_{(u,v)OFF3}$ and $S_{(u,v)OFF1}$ represent mutually different positions.

No data specifying a movement trajectory of the tool can be obtained for the space $SPC_1$ between position data $P_{(01)123}$, $P_{(11)12}$ to $P_{(41)12}$ and $P_{(02)123}$, $P_{(12)21}$ to $P_{(42)21}$, space $SPC_2$ between position data $P_{(02)123}$, $P_{(12)23}$ to $P_{(42)23}$ and $P_{(03)123}$, $P_{(13)32}$ to $P_{(43)32}$, the space $SPC_3$ between the position data $P_{(03)123}$, $P_{(13)31}$ to $P_{(43)31}$ and $P_{(01)123}$, $P_{(11)13}$ to $P_{(41)13}$, and the space $SPC_{123}$ between a position of the point $P_{(0)123}$ common to the three patches $S_{(u,v)1}$, $S_{(u,v)2}$ and $S_{(u,v)3}$ forming the corner part and position data $P_{(01)123}$, $P_{(02)123}$, and $P_{(03)123}$ (the spaces $SPC_1$, $SPC_2$, $SPC_3$, and $SPC_{123}$ are called discontinuous spaces).

In the discontinuous spaces $SPC_1$, $SPC_2$, $SPC_3$, and $SPC_{123}$, the tool which has continued the milling operation up to the positions of the common boundaries COM12, COM23, and COM31 of the patches $S_{(u,v)1}$, $S_{(u,v)2}$ and $S_{(u,v)3}$ may operate to draw an abnormal movement trajectory in the vicinities of the common boundaries COM12, COM23, and COM31. If the abnormal movement trajectory is left unchanged, the tool may unnecessarily mill and cut out portions of the surfaces near the common boundaries COM12, COM23, and COM31 of the object to be processed by the milling machine.

SUMMARY OF THE INVENTION

It is, therefore, a primary object of the present invention to provide a method for easily generating offset surface data to enable a milling machine to mill a contoured surface, even if a discontinuous space occurs between the offset surface data, without producing tool interference.

It is another object of the present invention to provide a method for generating offset surface data for use by a milling machine, in which the offset surface data represents a free surface, in a manner so that no tool interference occurs in the discontinuous space generated between the offset surface data on at least two mutually adjoining patches.

The above-described objects can be achieved by providing a method for generating offset surface data representing a tool path using a free surface formed with at least two patches sequentially interconnected, the method comprising the steps of: (a) generating first surface data representing a first offset surface opposing the patches and second surface data representing a second offset surface formed at a position separated by a first predetermined distance from a position on a boundary line of the patches where there is no continuity of the osculating planes; and (b) interpolating the second surface data for the first surface data so that when the tool traverses the boundary line the object represented by the free surface is not excessively milled.

In particular, the method generates offset surface data with data defining a free surface formed with at least first and second patches sequentially interconnected as a target to be milled, and comprises the steps of: (a) deriving an outwardly directed first vector normal to a first discontinuous end surface represented by first offset surface data corresponding to the first patch at each control point representing a common boundary of the first and second patches, and simultaneously deriving a second vector comprising a normal line vector represented by second offset surface data corresponding to the second patch; and (b) deriving a position of intersection between a plane of the second vector and the first vector and interpolating the intersection position data as third offset surface data at the discontinuous space generated between the first and second offset surface data.

In a preferred embodiment, the offset surface data is generated with a free surface formed with at least first, second, and third patches sequentially interconnected as a target to be milled. In such case, the method comprises the steps of (a) deriving first, second, and third normal line vectors on points corresponding to points common to the offset surface data of the mutually connected first, second, and third patches; (b) deriving an intersection of planes of the first, second, and third normal line vectors; and (c) interpolating the position data for the intersection as the offset surface data at a discontinuous space generated at the corner.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Reference will hereinafter be made to the drawings in order to facilitate understanding of the present invention.

A previously proposed method for generating offset surface data disclosed in a Japanese Patent Application Non-Examined Publication sho 62-135965 has been described above with reference to FIGS. 1 to 6.

(A) First Preferred Embodiment

Figure 7:
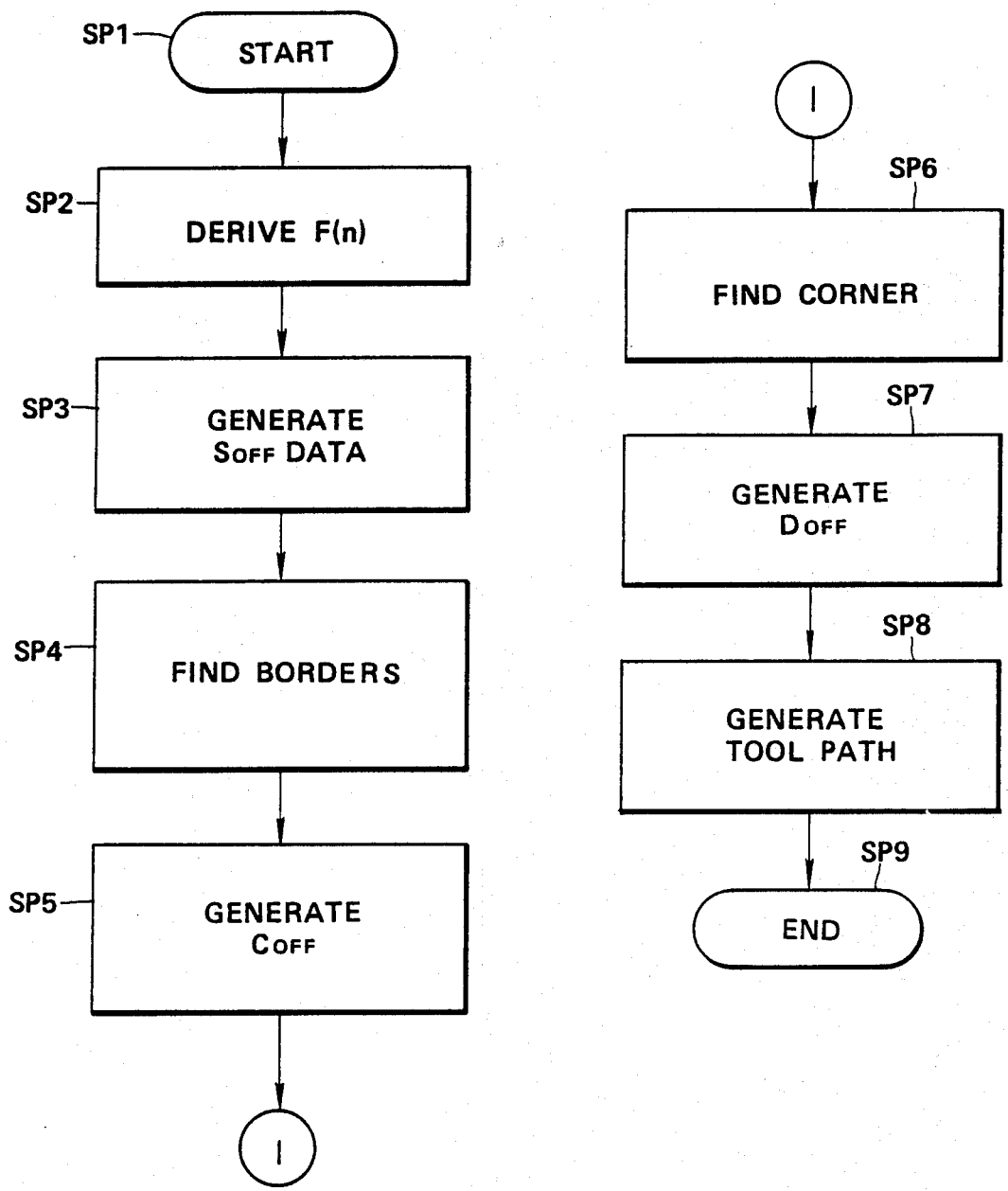
FIG. 7 is a processing flow chart in a first preferred embodiment of a method for generating offset surface data according to the present invention.

FIG. 7 shows a processing flow chart which illustrates the program followed by a Central Processing Unit (CPU) (not shown) of a computer constituting an apparatus for generating the offset surface data to define the path to be followed by the tool of a milling machine in milling an object. The milling machine is of the type having a tri-axial control type ball end mill (not shown). The CPU begins executing an interpolation calculation program for the offset surface data from a step SPI in FIG. 7, by reading data representing a multiple number of patches $S_{(u,v)1}$, $S_{(u,v)2}$, $S_{(u,v)3}$ . . . (refer to FIGS. 10 and 11) already designed by means of a fee surface generating apparatus, such as a CAD/CAM system, as required by the shape of the object to be milled.

In a step SP2, the CPU derives an offset variable E(n) (refer to the equation (7) above) of the offset surface with respect to patches $S_{((u,v)1}$, $S_{(u,v)2}$, $S_{(u,v)3}$, . . . which provide targets to be milled on the basis of the profile data on the tool supplied via an iput unit of the computer, such as a keyboard (not shown), by an operator at some other time.

In a step SP3, the CPU mathematically divides each patch $S_{(u,v)1}$, $S_{(u,v)2}$, $S_{(u,v)3}$, . . . into a multiple number of square surface elements, generates data representing a first offset surface on the basis of the above-described equations (5) and (6), and stores the data as an offset surface $S_{OFF}$ ($S_{OFF1}$, $S_{OFF2}$, $S_{OFF3}$, into the computer's digital memory (not shown).

Thereafter, the routine goes to a step SP4 in which the CPU determines whether the patch boundary lines establish the conditions of continuity of the osculating planes represented by the equations (1) to (3) on the basis of the data for the patches $S_{(u\,v)1}$, $S_{(u,v)2}$, and $S_{(u,v)3}$.

Since the free surfaces actually designed are sequentially connected to each other via boundary lines, the CPU processes the data to detect all boundary lines which do not establish the conditions of continuity of the osculating planes. Such boundary lines which do not satisfy the condition of continuity of the osculating planes can be derived using the equation's (1) and (2), i.e. they can be detected when the normal line vectors $n_1$ and $n_2$ for the boundary lines between the adjoining patches $S_{(u,v)1}$ and $S_{(u,v)2}$ and between $S_{(u,v)2}$ and $S_{(u,v)3}$, ... do not coincide with each other or when no patch adjoining one of the boundary lines is present.

Figure 10:
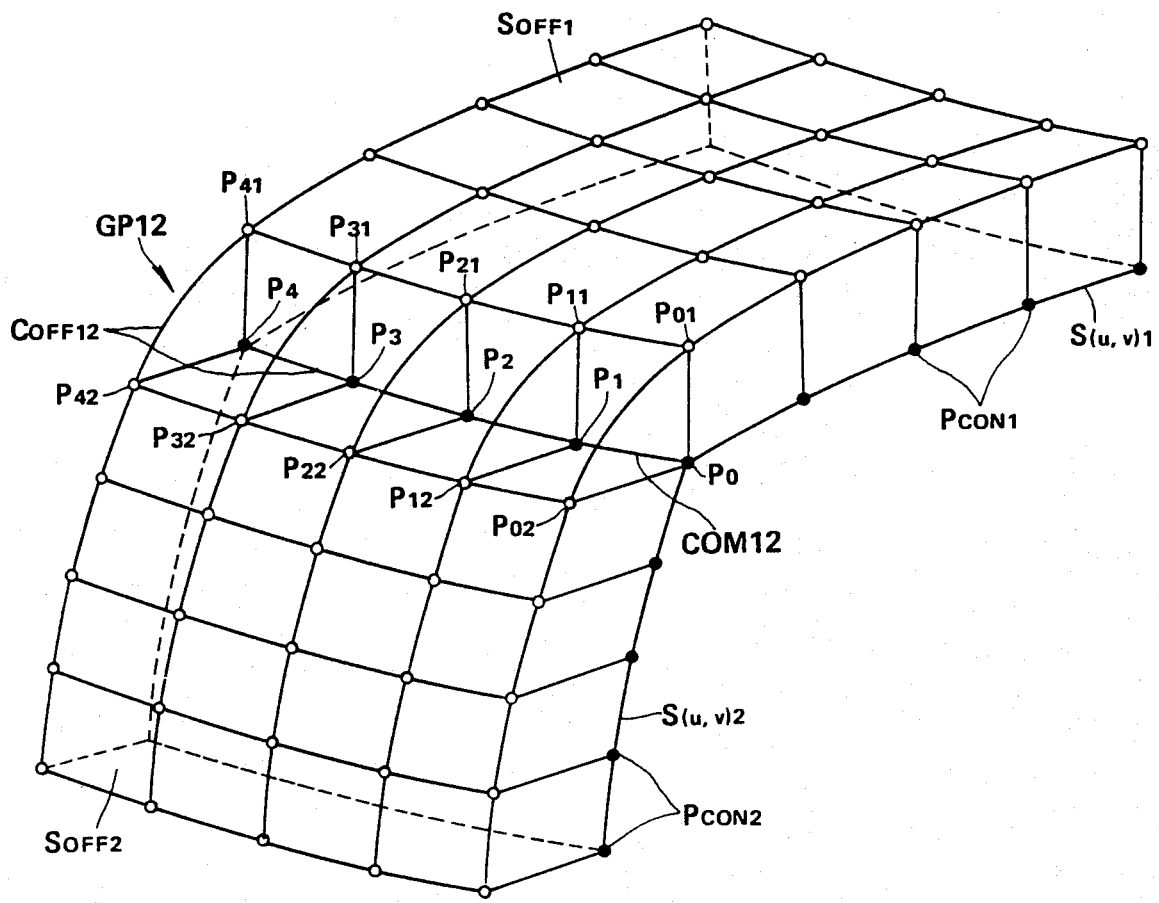
FIGS. 10 and 11 are schematic diagrams of offset surfaces interpolated by means of a tubular offset surface and a spherical offset surface, respectively.
Figure 11:
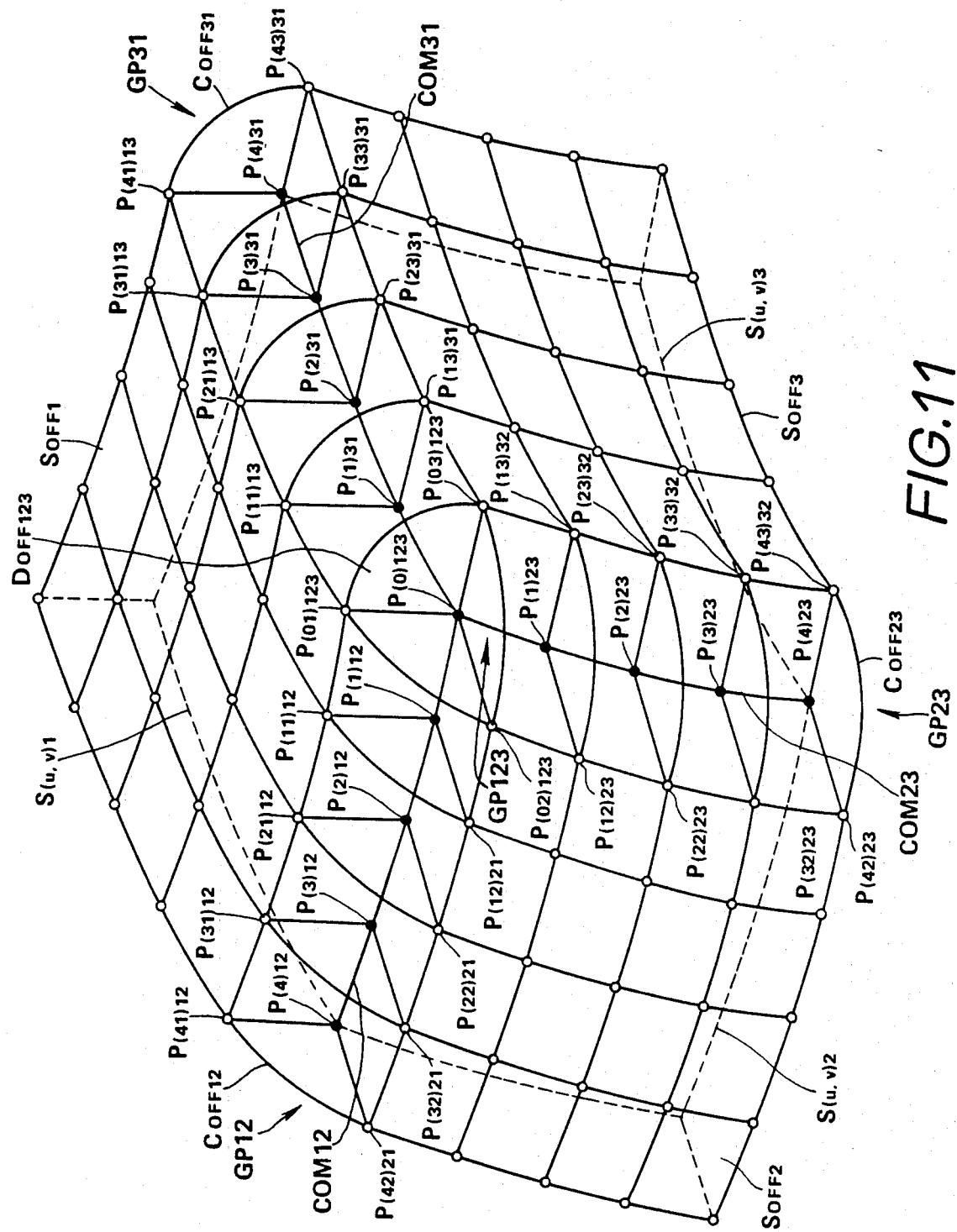

The CPU then generates in a step SP5 a tubular second offset surface data $C_{OFF}$, i.e., $C_{OFF12}$ in the case of FIG. 10, and $C_{OFF12}$, $C_{OFF23}$, $C_{OFF31}$ in the case of FIG. 11, on the boundary surfaces which do not establish the condition of continuity of the osculating planes.

Figure 8:
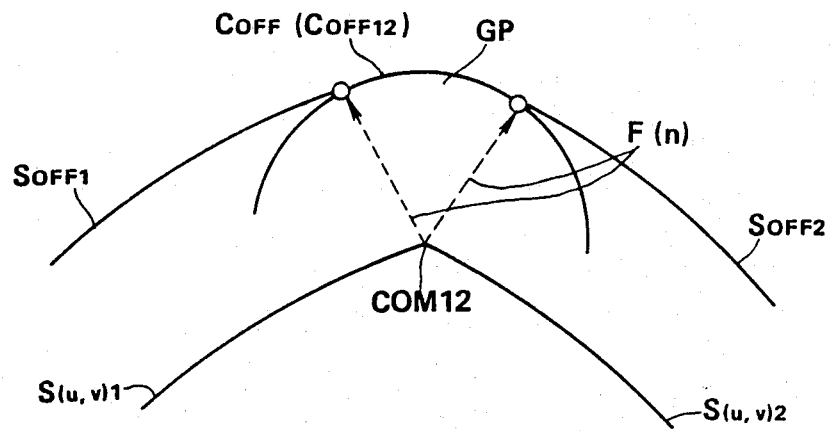
FIGS. 8 and 9 are schematic diagrams of a method for generating a tubular offset surface for interpolating discontinuous spaces generated in boundary lines.

For example, as described above with reference to FIG. 5, when the two sheets of patches $S_{(u,v)1}$ and $S_{(u,v)2}$ are interconnected under the condition of non-continuity of the osculating planes at the boundary line COM12, the CPU generates a tubular surface at each point on the boundary line COM12, the tubular surface having a radius corresponding to the length of an offset vector $F(n)$, i.e., $|F(n)|$ (which corresponds to a radius R in the case of a ball end mill) as shown in FIG. 8 and having a semicircular cross section. The tubular surface is used as a second offset surface $C_{OFF}$ ($=C_{OFF12}$).

The second offset surface $C_{OFF}$ ($=C_{OFF12}$) is connected to offset surfaces $S_{OFF1}$ and $S_{OFF2}$ opposing the patches $S_{(u,v)1}$ and $S_{(u,v)2}$ at arbitrary points on the boundary line COM12 as shown in FIG. 8. An interpolation of the offset surface can be carried out so as to enclose a discontinuous space GP12 between the offset surfaces $S_{OFF1}$ and $S_{OFF2}$ at a position remote by a distance $|F(n)|$ ($=R$) from the boundary line COM12 with the second offset surface $C_{OFF}$ ($=C_{OFF12}$)

Figure 9:
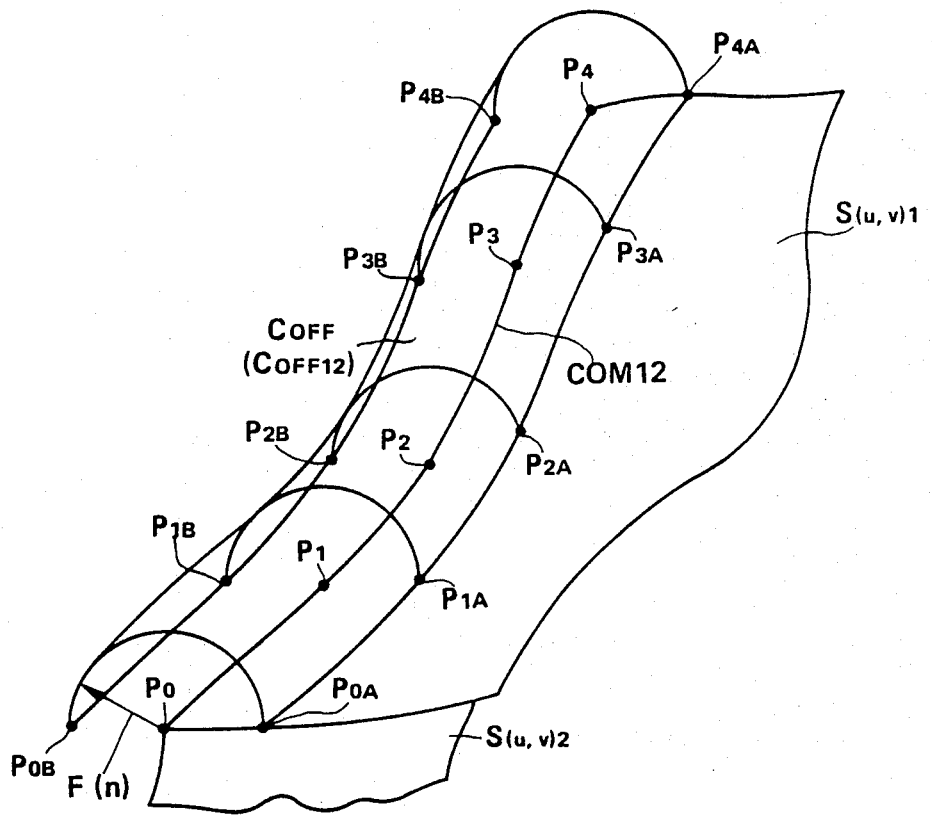

Since the tool constituted by a tri-axial control type ball end mill is actually mounted so as to move in a Z axis direction from an upward position to a downward position, only an upward part of the tubular surface can effectively be used when the tool is moved along the second offset surface $C_{OFF}$($=C_{OFF12}$). Hence, the CPU uses a tubular surface having the semicircular cross section as the second offset surface $C_{OFF}$ ($=C_{OFF12}$) to draw upper semicircles ($P_{0A}$ to $P_{0B}$) to ($P_{4A}$ to $P_{4B}$) with cut points $P_0$ to $P_4$ as centers placed on the boundary line COM12, as shown in FIG. 9.

Figure 1:
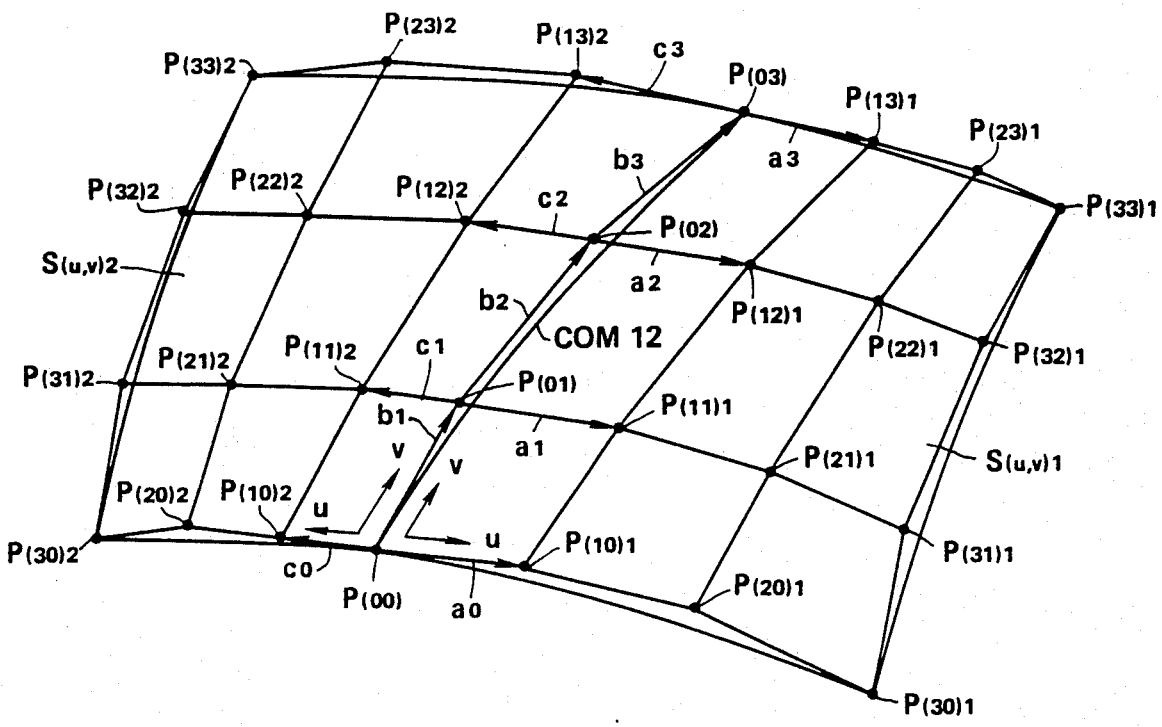
FIG. 1 is a schematic diagram for explaining a boundary line interconnecting two patches disclosed in a Japanese Patent Application Non-Examined Publication Sho No. 62-135965.
Figure 2:
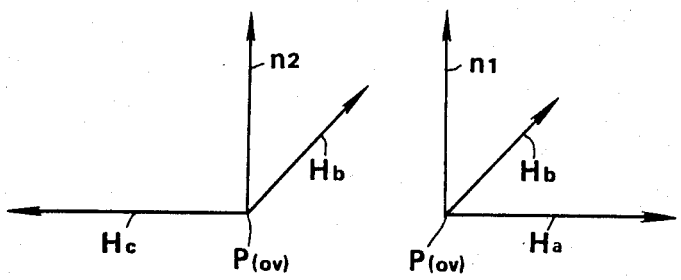
FIG. 2 is a vector diagram for explaining the condition of continuity of the osculating planes.
Figure 3:
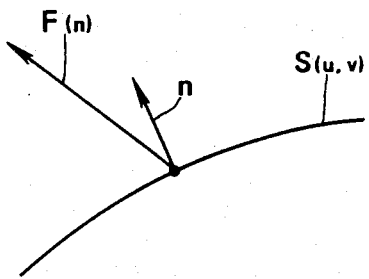
FIG. 3 is a vector diagram for explaining an offset vector.
Figure 4:
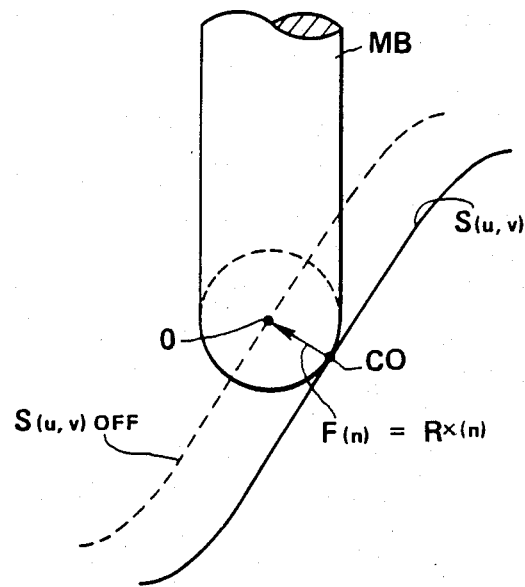
FIG. 4 is a schematic diagram for explaining the trajectory of the tool.
Figure 5:
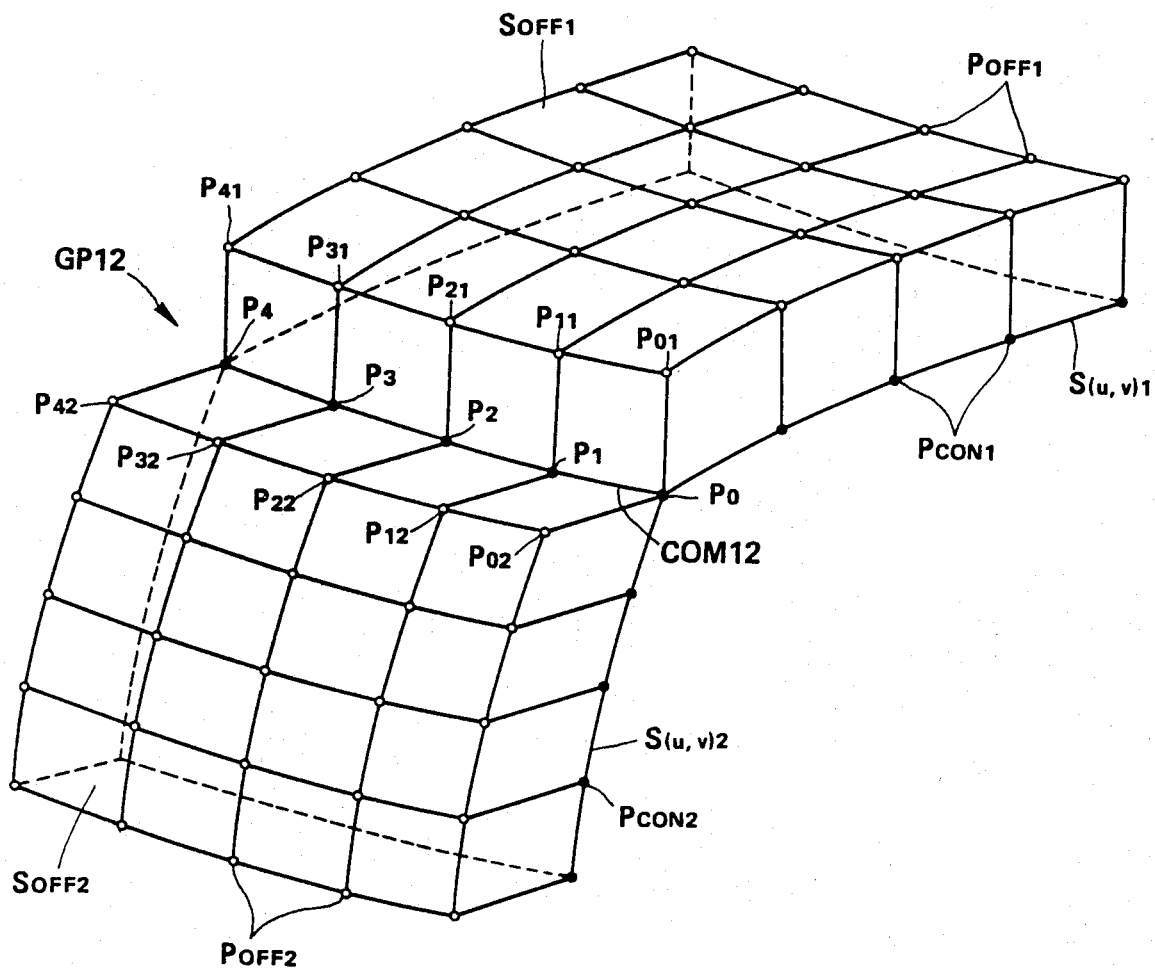
FIGS. 5 and 6 are schematic diagrams for explaining discontinuous spaces generated between offset surfaces.
Figure 6:
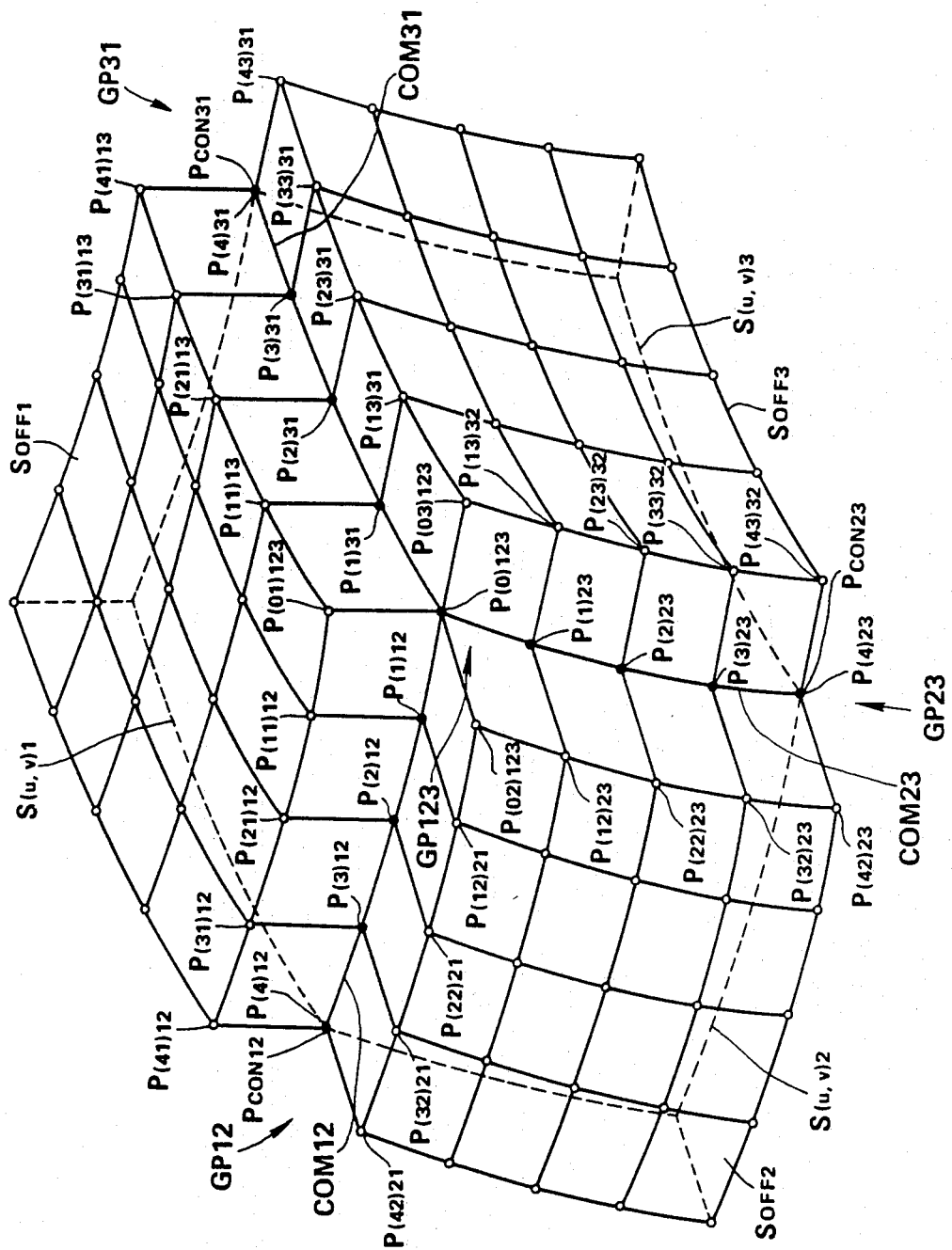

In the same way, as described with reference to FIG. 6, when the three patches $S_{(u,v)1}$, $S_{(u,v)2}$, and $S_{(u,v)3}$ are connected under the condition of non-continuity of the osculating planes at the boundary lines COM12, COM23, and COM31, the CPU generates an offset surface $C_{OFF}$ constituted by a tubular surface having a semicircular cross section and a radius corresponding to a length $|F(n)|$ ($=R$) of an offset vector $F(n)$ for each point on the boundary lines COM12, COM23, and COM31.

The CPU detects a sharpened corner from the surface data of the patches $S_{(u,v)1}$, $S_{(u,v)2}$, ... in a step SP6. In the processing for this step SP6, when a plurality of boundary lines intersect on articulation points placed at both ends of the boundary lines enclosing each patch, the CPU determines that the corner is not sharpened at the articulation point if at least one boundary line satisfying the condition of continuity of the osculating planes is included. On the other hand, the CPU determines that a corner at which the articulation point is present is sharpened if there is no boundary line satisfying the condition of continuity of the osculating planes or where there is no patch to be connected to the position adjoining the corner.

In detail, for example, when the three patches $S_{(u,v)1}$, $S_{(u,v)2}$, and $S_{(u,v)3}$ are interconnected, the three boundary lines COM12, COM23, and COM31 intersect on the articulation point $P_{(0)123}$, as can best be appreciated from FIG. 11. However, since none of the boundary lines COM12, COM23, or COM31 establishes the condition of continuity of the osculating planes, the CPU determines that a part located at one end of the boundary lines COM12, COM23, and COM31 and in which the articulation point $P_{(0)123}$ is present is a sharp corner.

Figure 12:
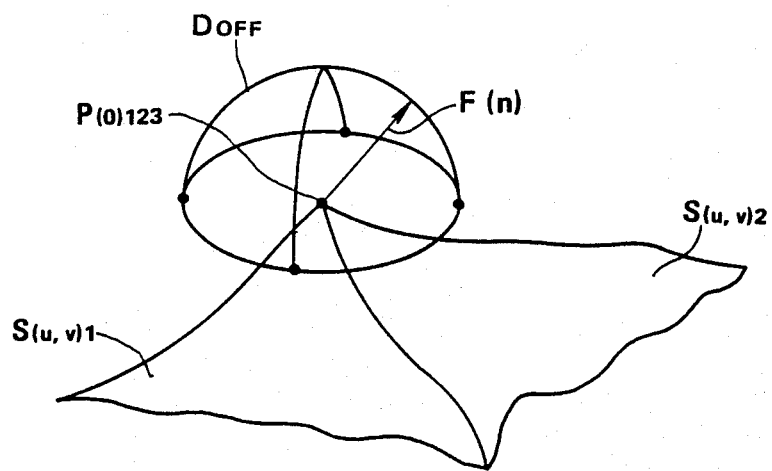
FIG. 12 is a schematic diagram of the spherical offset surface for a sharp corner.

After the CPU detects whether the corner is sharp, the CPU generates a third offset surface $D_{OFF}$ constituted by a spherical surface ($D_{OFF123}$) at the sharp corner in a step SP7, as shown in FIG. 12.

The offset surface $D_{OFF}$ comprises, as shown in FIG. 12, a sphere having a semicircular cross section and having a radius corresponding to an offset quantity of the tool, i.e., $|F(n)|$ ($=R$) with an articulation point $P_{(0)123}$ of the sharp corner as a center.

Since in this embodiment the tool comprises a triaxial control type ball end mill, the third offset surface $D_{OFF}$ is selected to be a semispherical surface comprising an upper part of the sphere as a movable range of the tool to mill the object. The data for the third offset surface $D_{OFF}$ is stored in the CPU's memory (not shown).

In summary, then, in steps SP1 to SP7 the CPU generates the tubular second offset surface $C_{OFF}$($=C_{OFF12}$, $C_{OFF23}$, $C_{OFF31}$) if there is a discontinuous space GP ($=GP_{12}$, $GP_{23}$, $GP_{31}$) along the boundary lines COM12, COM23, and COM31 for the first offset surface $S_{OFF}$ ($=S_{OFF1}$, $S_{OFF2}$, $S_{OFF3}$) formed on the basis of the surface data which forms the patches, e.g., as shown in FIG. 11. If there is a sharp corner, the CPU generates the spherical third offset surface $D_{OFF}$ ($=D_{OFF123}$) for the discontinuous space GP123 generated due to the presence of the sharpened corner. Thereafter, the CPU generates data defining a tool path on the basis of the first, second, and third offset surfaces $S_{OFF}$, $C_{OFF}$, and $D_{OFF}$ in a step SP8. In a step SP9, the above-described processing program routine shown in FIG. 7 ends.

Since, as shown in FIG. 10, the boundary line COM12 of the patches $S_{(u,v)1}$ and $S_{(u,v)2}$ is connected under the condition of non-continuity of the osculating planes for those patches, the discontinuous space GP ($=GP12$) is present between the offset surfaces $S_{OFF1}$ and $S_{OFF2}$ opposing the patches $S_{(u,v)1}$ and $S_{(u,v)2}$. In this case, the CPU interpolates the tubular second offset surface $C_{OFF}$($=C_{OFF12}$) formed over the discontinuous space GP ($=GP12$) with the boundary line COM12 as a center.

Figure 13:
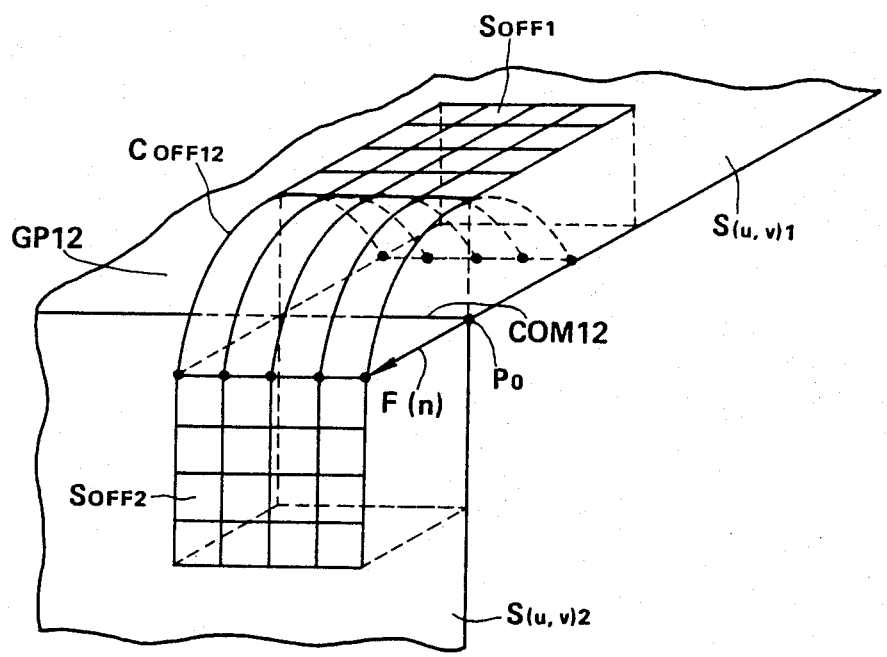
FIGS. 13 and 14 are schematic diagrams for explaining selection methods for the offset surfaces.

The tubular offset surface $C_{OFF}$ ($=C_{OFF12}$) can now connect between the offset surfaces $S_{OFF1}$ and $S_{OFF2}$ opposing the patches $S_{(u,v)}$ and $S_{(u,v)2}$ by means of the tubular surface separated by the offset quantity $|F(n)|$ ($=R$) from the boundary line COM12 at the discontinuous space GP ($=GP12$), as shown in FIG. 13.

The CPU selects a part of the second offset surface $C_{OFF12}$ which is hidden by the inside of the offset surfaces $S_{OFF1}$ and $S_{OFF2}$ opposing the patches $S_{(u,v)1}$ and $S_{(u,v)2}$ so as not to use the part as the offset surface (FIG. 13). The CPU then derives the offset surface representing a tool path by selecting only the part of surface having positional data for the outermost part from the generated surfaces $S_{OFF1}$, $S_{OFF2}$, and $C_{OFF12}$.

While milling the patch $S_{(u,v)1}$, when the tool's blade edge has reached a position on the boundary line COM12 at which the condition of continuity of the osculating planes is not established, the center of the tool is controlled so as to move on the offset surface $C_{OFF12}$ interpolated so as to cover the discontinuous space GP12. Thereafter, the tool moves on the offset surface $S_{OFF2}$ opposing the patch $S_{(u,v)2}$. Hence, when the tool moves across the discontinuous space GP12, the edge of the blade does not drop to a position deeper than the position of the boundary line COM12. Therefore, the tool can sufficiently and desirably mill the two patches $S_{(u,v)1}$ and $S_{(u,v)2}$ connected via the boundary line COM12 which does not satisfy the condition of continuity of osculating planes.

Consider now the case where a free surface connecting the three patches $S_{(u,v)1}$, $S_{(u,v)2}$, and $S_{(u,v)3}$ exhibits non-continuity of the osculating planes and is to be milled. In such a case, the CPU, as shown in FIG. 11, interpolates the discontinuous spaces GP12, GP23, and GP31, which are generated between the offset surfaces $S_{OFF1}$, $S_{OFF2}$, and $S_{OFF3}$ and which oppose these patches, using the second offset surface $C_{OFF12}$, $C_{OFF23}$, and $C_{OFF31}$.

The articulation point $P_{(0)123}$, to which the three patches $S_{(u,v)1}$, $S_{(u,v)2}$, and $S_{(u,v)3}$ are commonly connected, forms the sharpened corner as described above with reference to FIG. 6. The corner is interpolated by means of the above-described third offset surface $D_{OFF123}$.

Figure 14:
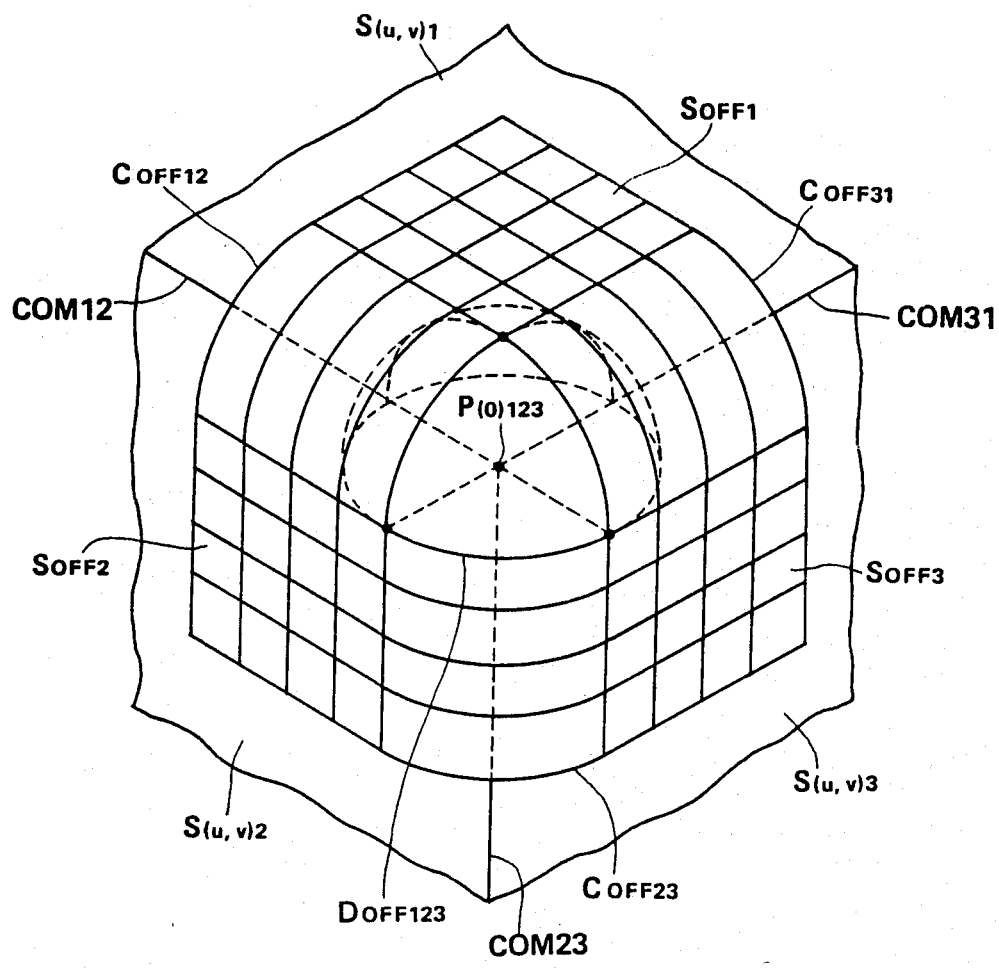

In this case, the CPU can form a whole offset surface for determining the trajectory of the tool, i.e., the tool path, by selecting one of the three offset surfaces located at the outermost of the three offset surfaces from the tubular second offset surfaces $C_{OFF12}$, $C_{OFF23}$, $C_{OFF31}$, the spherical third offset surface and the first offset surfaces $S_{OFF1}$, $S_{OFF2}$, and $S_{OFF3}$ opposing the patches $S_{(u,v)1}$, $S_{(u,v)2}$, and $S_{(u,v)3}$, as shown in FIG. 14.

In the above configuration of the first embodiment, the CPU interpolates the tubular offset surface $C_{OFF}$ for the boundary line of each patch forming the free surface to be a target of milling and for the boundary line at which there is non-continuity of the osculating planes. In addition, when the corner of one end of the boundary line is sharpened, the CPU interpolates the spherical offset surface $D_{OFF}$. When the tool moves and mills the free surface which is the milling target, the milling operation for a single patch is ended. Thereafter, when the tool moves across the boundary line, the CPU can easily form a tool path which prevents the tool mill from cutting excessively off the boundary line of the patch which is the milling target.

In the above-described preferred embodiment, the milling machine uses a tri-axial control type tool in which the tool blade edge is attached thereto so as to be directed downward in the Z direction to mill the object.

Another tool which can arbitrarily change the direction of the edge of blade may, alternatively, be used in the milling machine. In such case, the tubular second offset surface $C_{OFF}$ ($C_{OFF12}$, $C_{OFF23}$, $C_{OFF31}$) is formed on a boundary line where there is non-continuity of the osculating planes. When the spherical third offset surface $D_{OFF}$ ($D_{OFF123}$) is formed on a sharp corner, with the tool of the tri-axial control type ball end mill attached vertically in the Z direction taken into account, the lower halves of the tubular offset surface $C_{OFF}$ and spherical offset surface $D_{OFF}$ are not actually used to form the tool path. Therefore, the lower halves thereof are omitted in the preferred embodiment. However, in the case where the machine tool whose blade edge can arbitrarily change its direction is used, the CPU generates a cylindrical surface having a circle in cross section as the second offset surface and generates a spherical surface having a circle in cross section as the third offset surface. Various types of tools can be used such as flat end mills whose blade edge is flat and tools having blade edges which are combinations of ball end mills and flat end mills. In the combination end mill case, the offset vector F(n) in the second terms in the equations (5) and (6) are selected on the basis of the tool profile so that the second and third offset surfaces $C_{OFF}$ and $D_{OFF}$ are interpolated for the offset surface $S_{OFF}$. A tool path can be generated wherein the tool blade edge is prevented from unnecessarily milling the target surface.

Although, in the first preferred embodiment, the first offset surface $S_{OFF}$ and the second and third offset surfaces $C_{OFF}$ and $D_{OFF}$ are cut in square surface elements having predetermined sizes and an offset polyhedron is formed on the basis of data at their vertex positions, the polyhedron may be formed by calculating a function such as a Bezier equation or a B-spline equation.

(B) Second Preferred Embodiment

The CPU which generates the offset surface data described above reads the data for the three patches $S_{(u,v)1}$, $S_{(u,v)2}$, $S_{(u,v)3}$ forming the corner already generated by means of the apparatus for generating the free surface (e.g. a CAD/CAM system (not shown)) and the offset surface data $S_{(u,v)OFF1}$, $S_{(u,v)OFF2}$, and $S_{(u,v)OFF3}$ (FIG. 6) generated on the basis of this patch data as required for defining the surface to be milled. The CPU, at this time, enters the interpolation calculation program for the offset surface data from a step SP100 of FIG. 15.

(G1) Interpolation of Discontinuous Spaces $SPC_1$, $SPC_2$, and $SPC_3$.

Figure 17:
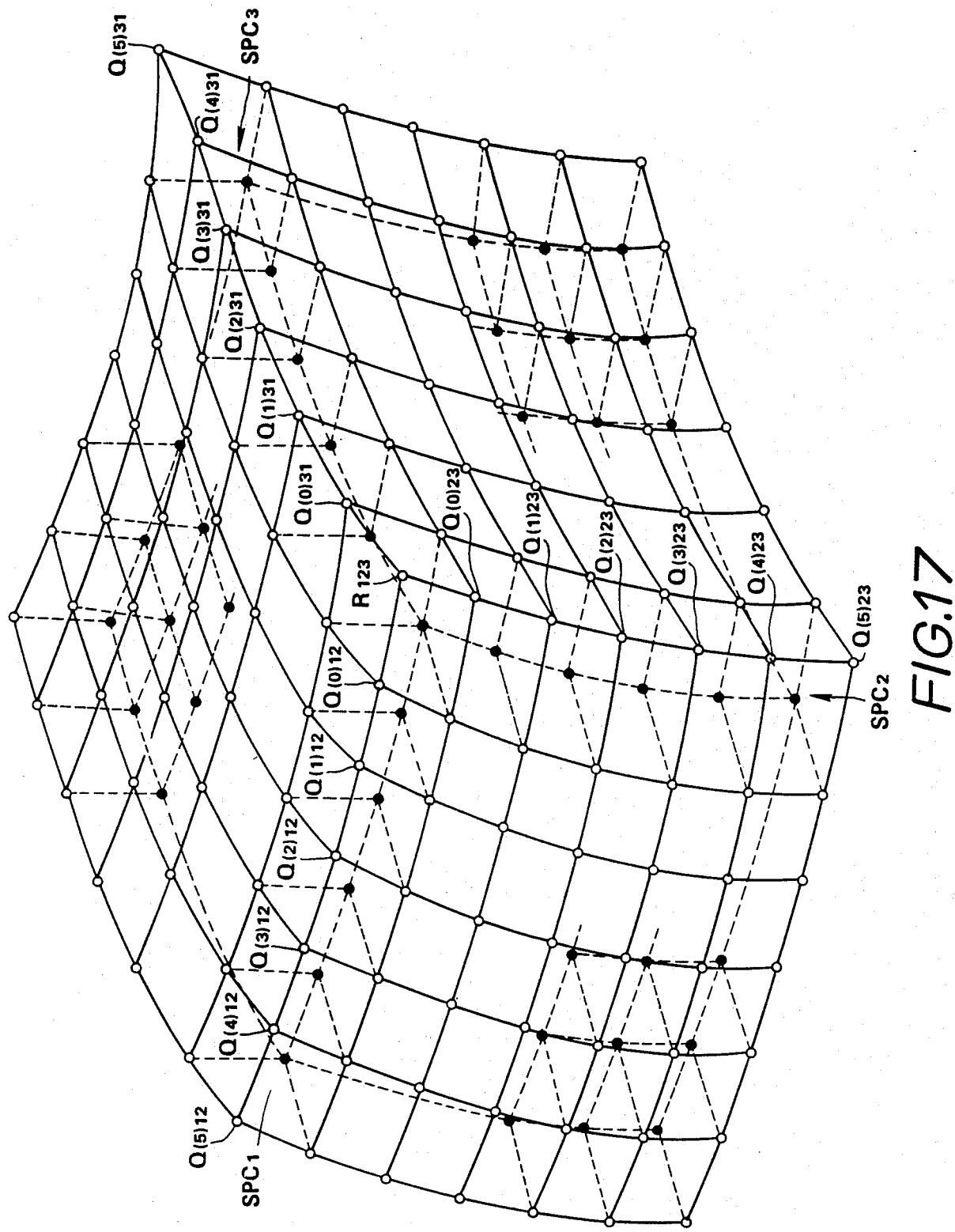
FIG. 17 is a schematic diagram of the offset surface data derived as a result of the interpolation calculation.

Referring to FIG. 17, the CPU interpolates the offset surface data $Q_{(0)12}$ to $Q_{(5)12}$, $Q_{(0)23}$ to $Q_{(5)23}$, and $Q_{(0)31}$ to $Q_{(5)31}$ for the discontinuous spaces $SPC_1$, $SPC_2$, and $SPC_3$ (an end surface enclosing each discontinuous space is referred to as a discontinuous end surface) generated between offset surface data $S_{(u,v)OFF1}$ and $S_{(u,v)OFF2}$, $S_{(u,v)OFF2}$ and $S_{(u,v)OFF3}$, and $S_{(u,v)OFF3}$ and $S_{(u,v)OFF1}$ corresponding to the respective two patches $S_{(u,v)1}$ and $S_{(u,v)2}$, $S_{(u,v)2}$ and $S_{(u,v)3}$, and $S_{(u,v)3}$ and $S_{(u,v)1}$.

Figure 15:
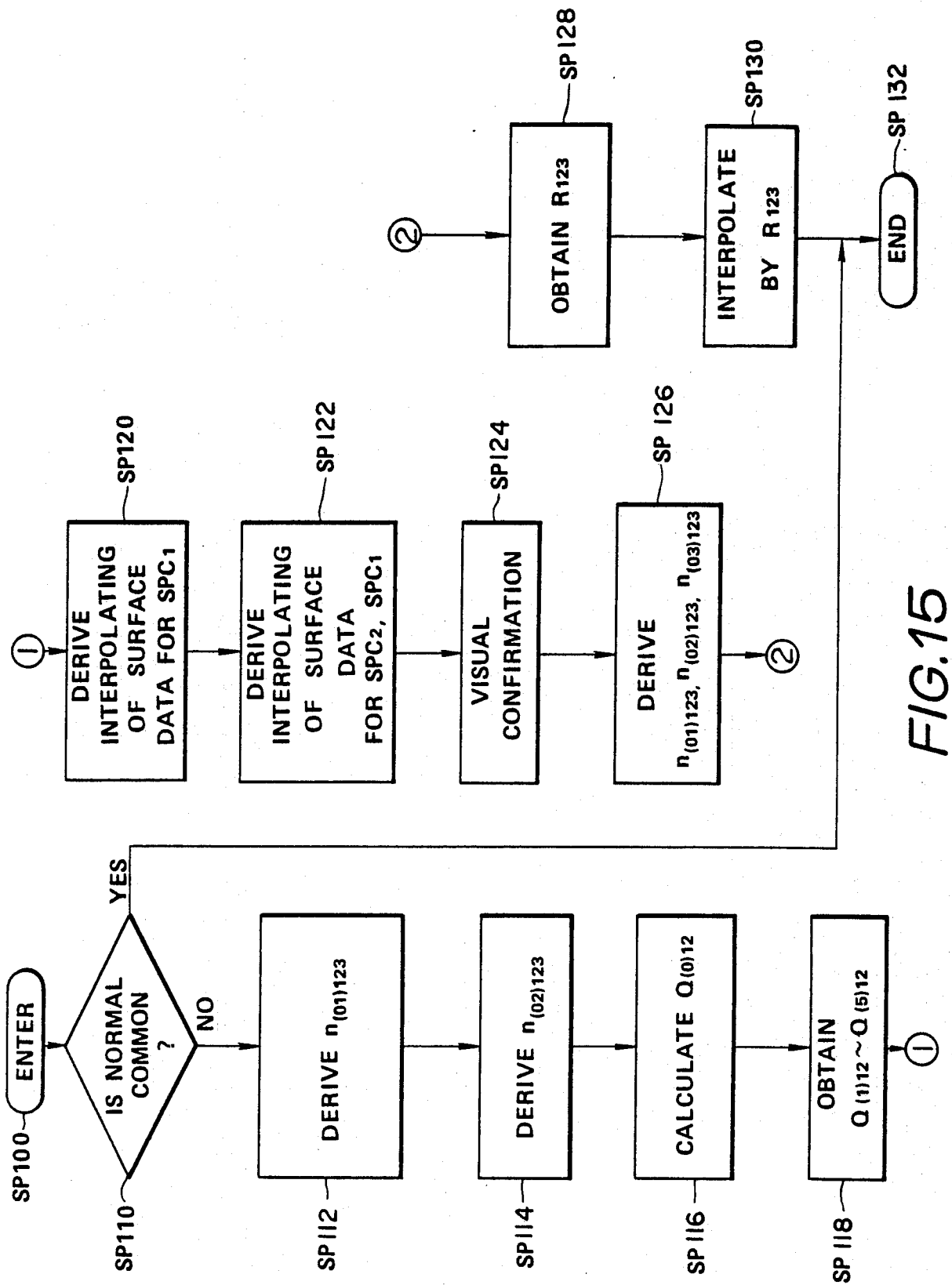
FIG. 15 is a processing flow chart of the method according to a second preferred embodiment of the present invention.

In detail, the CPU checks whether the normal line on the common boundaries COM12, COM23, and COM31 are mutually common to the patches $S_{(u,v)1}$, $S_{(u,v)2}$ and $S_{(u,v)3}$ in a step SP110 of FIG. 15. If the answer is YES in the step SP110, the CPU determines that the patches $S_{(u,v)1}$, $S_{(u,v)2}$, and $S_{(u,v)3}$ are mutually connected so as to satisfy the condition of continuity of the osculating planes as described above with reference to FIG. 2. In this case, no discontinuous space is generated between the offset surface data $S_{(u,v)OFF1}$, $S_{(u,v)OFF2}$, and $S_{(u,v)OFF3}$. The CPU, therefore, executes the contents of step SP132, i.e., ends the processing program shown in FIG. 15.

If the answer is NO in the step SP110, the CPU executes the contents of Step SP112. As described below, the CPU starts the execution of interpolation calculations of corresponding discontinuous spaces $SPC_1$, $SPC_2$, and $SPC_3$ sequentially using the data for the common boundaries COM12 COM23, and COM31.

That is to say, the CPU starts execution of interpolation on the point $P_{(0)123}$ (FIG. 6) of the zero order from among control points representing the common boundary COM12 in the step SP112.

Figure 18:
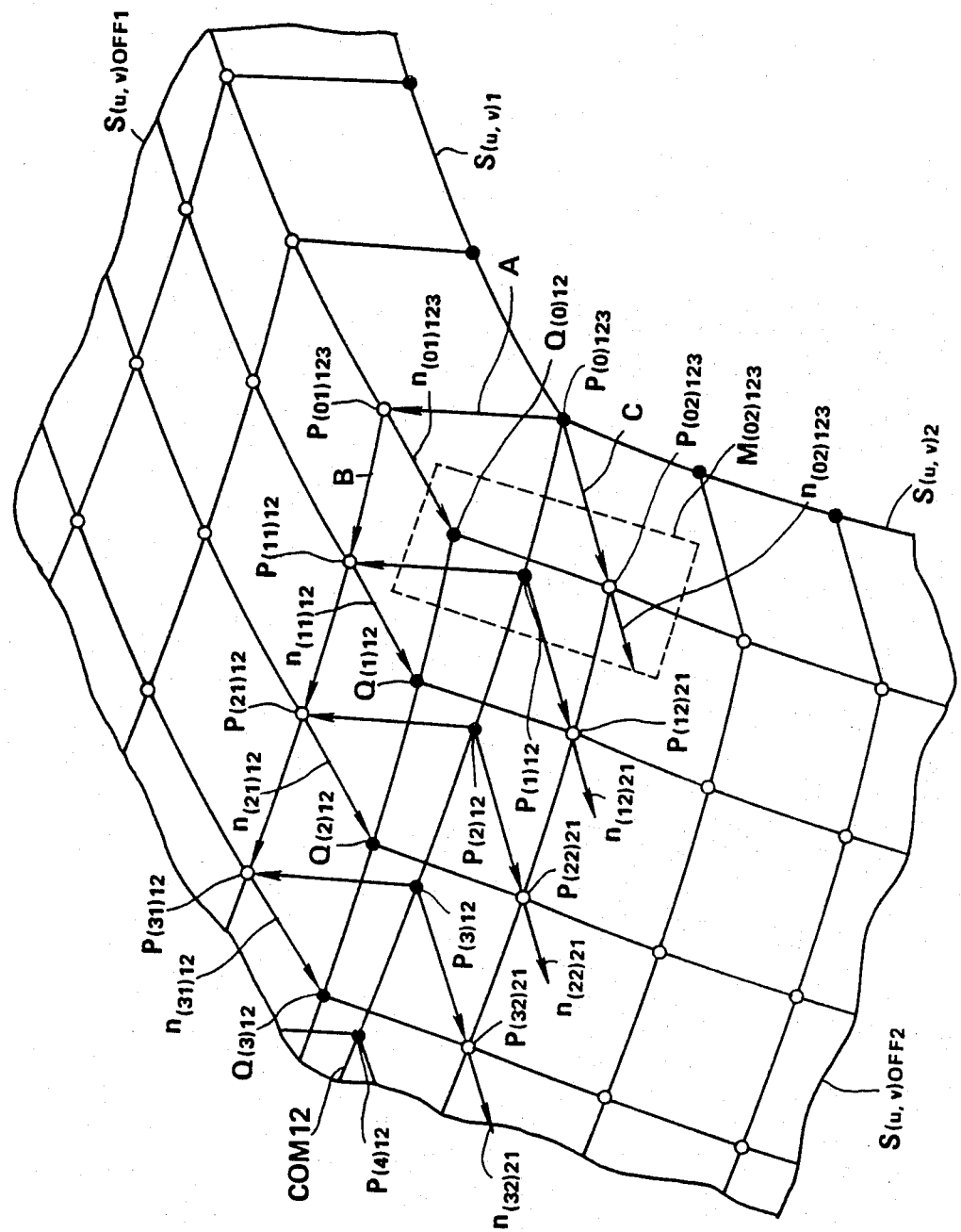
FIG. 18 is a schematic diagram of a procedure for generating the interpolation data of the discontinuous space generated between the two patches.

For the control point $P_{(0)123}$ representing the point expressed as u=0 and v=0, the vectors A and B are derived from the data for the points $P_{(01)123}$ and $P_{(11)12}$ corresponding to the control points $P_{(0)123}$ and $P_{(1)12}$ representing the common boundary COM12 from among the offset surface data $S_{(u,v)OFF1}$ for the first patch $S_{(u,v)1}$ as shown in FIG. 18. The vectors A and B can be expressed in the following equations.

$$A = P_{(01)123} - P_{(0)123} = Rxn_{(0,0)1} \quad (11)$$

$$B = P_{(11)12} - Rxn_{(11)12} - (P_{(0)123} + Rxn_{(01)123}) \quad (12)$$

The vector A represents parallel surface data (second term of the equation (8)) on the point $P_{(0)123}$ and comprises a difference vector from the point $P_{(0)123}$ to the point $P_{(0)123}$.

The vector B represents a point $P_{(11)12}$ on the offset surface data $S_{(u,v)OFF1}$ corresponding to the point $P_{(1)12}$ of u=0 and v=1 representing the common boundary with respect to a position vector $P_{(01)123}$ represented by the vector A.

The generated vectors A and B represent a height of the end surface part enclosed by points $P_{(01)123}$—$P_{(11)12}$—$P_{(1)12}$—$P_{(0)123}$—$P_{(01)123}$ with the point $P_{(01)123}$ as a center among the offset surface data $S_{(u,v,)OFF1}$ associated with the patch $S_{(u,v,)1}$ and discontinuous space $SPC_1$ generated in the common boundary COM12 and gradient of the end surface at the point $P_{(01)124}$, respectively.

Hence, if a vector product is derived using the following equation:

$$n_{(01)123} = A \times B \quad (13)$$

the normal line vector $n_{(01)123}$ at a point $P_{(01)123}$ of the end surface parts $P_{(01)123}$—$P_{(11)12}$—$P_{(1)12}$—$P_{(0)12}$-3—$P_{(01)123}$ can be derived.

Hence, at step SP112 the CPU can derive data for the normal line vector $n_{(01)123}$ representing the height and gradient of the discontinuous end surface $P_{(01)123}$—$P_{(11)12}$—$P_{(1)12}$—$P_{(0)123}$—$P_{(01)123}$ on the basis of the data in the vicinity of the point $P_{(0)123}$ of the zero order representing the common boundary COM12 from the offset surface data for the first patch $S_{(u,v)1}$.

The $CP_U$ next executes the step SP114 in which the CPU calculates the following equation using the point $P_{(02)123}$ on the offset surface data $S_{(u,v)OFF2}$ corresponding to the control point $P_{(0)123}$ representing the common boundary COM12 derived from the offset surface data $S_{(u,v)OFF2}$ on the second patch $S_{(u,v)2}$:

$$\begin{aligned} G &= P_{(02)123} - P_{(0)123} \\ &= Rxn_{(0,0)2} \end{aligned} \quad (14)$$

The vector G is from the point $P_{(0)123}$ to the point $P_{(02)123}$. The normal line vector $n_{(02)123}$ at the point $P_{(02)123}$ in the same direction as the vector G can be derived from the data representing the points $P_{(02)123}$—$P_{(12)21}$—$P_{(1)12}$—$P_{(0)123}$—$P_{(02)123}$, i.e., the end surface portion of the discontinuous end surface at the position of the common boundary COM12.

As shown in the broken line of FIG. 18, the normal line vector $n_{(02)123}$ may be considered as a plane $M_{(02)123}$ at the point $P_{(02)123}$. A plane on which the normal line vector $n_{(02)123}$ is a normal line is called a plane of the normal line vector $n_{(2)123}$. The CPU calculates, in a step SP116, a position vector $Q_{(0)12}$ representing an intersection of a plane $M_{(02)123}$ of the normal line Vector $n_{(02)123}$ and of the normal line vector $n_{(02)123}$ at the point $P_{(01)123}$.

The position vector representing the point $Q_{(0)12}$ which can be derived as a result of calculation described above is placed on a line extending in a direction orthogonal to the discontinuous end surface at the point $P_{(01)123}$ on the offset surface data $S_{(u,v)OFF1}$ on the patch $S_{(u,v)1}$ including the point $P_{(0)123}$ representing the common boundary COM12, as shown in FIG. 18, and is placed within a plane $M_{(02)123}$ orthogonal to the normal line vector $n_{(02)123}$ of the point $P_{(02)123}$ on the offset surface data $S_{(u,v)OFF2}$ of the second patch $S_{(u,v)2}$.

Hence, during the process in which the center of the tool moves along the surfaces $S_{(u,v)1}$ and $S_{(u,v)2}$ on the line represented, for example, by v=0, passing on the common boundary surface COM12 on the basis of the offset surface data $S_{(u,v)OFF1}$ and $S_{(u,v)OFF2}$ of the first patch $S_{(u,v)1}$, the center of tool finally reaches a point $P_{(01)123}$ on the first patch $S_{(u,v)1}$. At this time, the center of the tool is moved from the point $P_{(01)123}$ to the point $Q_{(0)12}$ while the subsequent milling on the second patch $S_{(u,v)2}$ is started from the point $P_{(02)123}$. Then, when the center of the tool is moved from the point $P_{(01)123}$ to the point $Q_{(0)12}$, the tool blade edge can be moved from the point $P_{(01)123}$ on the first offset surface data $S_{(u,v)OFF1}$ to the point $P_{(02)123}$ on the second offset surface data $S_{(u,v)OFF2}$.

Thus, although the center of the tool is moved from the point $P_{(01)123}$ of the offset surface data $S_{(u,v)OFF1}$ of the first patch $S_{(u,v)1}$ to the point $P_{(02)123}$ of the offset surface data $S_{(u,v)OFF2}$ of the second patch $S_{(u,v)2}$, a tool path is generated wherein the tool blade edge is prevented from unnecessarily milling the target surface.

When the center of the tool reaches the point $P_{(02)123}$ corresponding to the point $P_{(0)123}$ on the common boundary COM12 of the second patch $S_{(u,v)2}$, the center of the tool, thereafter, moves on the offset surface data $S_{(u,v)OFF2}$. The CPU can generate data such that the tool blade edge can restart the milling on the second patch $S_{(u,v)2}$ from the point $P_{(0)123}$ on the common boundary COM12.

The $CP_U$ calculates the data for the point $Q_{(0)12}$ at step SP116. Thereafter, in a step SP118, the $CP_U$ similarly calculates data for the points $P_{(1)12}$, $P_{(2)12}$, $P_{(3)12}$, $P_{(4)12}$, and $P_{(5)12}$ representing the common boundary COM12. After calculating the data for the points $Q_{(1)12}$, $Q_{(2)12}$, $Q_{(3)12}$, $Q_{(4)12}$, and $Q_{(5)12}$ corresponding to the discontinuous space $SPC_1$, using a similar technique, the positional data $Q_{(0)12}$ to $Q_{(5)12}$ derived through the same calculation are interpolated as the surface data representing the movement position of the tool at the discontinuous space $SPC_1$ between the offset surface data $S_{(u,v)OFF1}$ and $S_{(u,v)OFF2}$.

The CPU generates and interpolates the offset surface data ($Q_{(0)12}$, $Q_{(1)12}$, $Q_{(2)12}$, $Q_{(3)12}$, $Q_{(4)12}$, $Q_{(5)12}$) on the discontinuous space $SPC_1$ in the steps SP112 to SP120 in FIG. 15. In the subsequent step SP122, the CPU generates and interpolates the offset surface data ($Q_{(0)23}$, $Q_{(1)23}$, $Q_{(2)23}$, $Q_{(3)23}$, $Q_{(4)23}$, $Q_{(5)23}$) and ($Q_{(0)31}$, $Q_{(1)31}$, $Q_{(2)31}$, $Q_{(3)31}$, $Q_{(4)31}$, $Q_{(5)31}$) for the discontinuous spaces $SP_{C2}$ and $SPC3$ in the same way as described above.

Consequently, the CPU ends the interpolation program for the offset surface data for the discontinuous spaces $SPC_1$, $SPC_2$, and $SPC_3$ in the steps SP112 to SP122 described above.

When the tool of the milling machine is moved using the offset surface data generated in the way described above, the center of the tool is moved along the offset surface data $S_{(u,v)OFF1}$, $S_{(u,v)OFF2}$, and $S_{(u,v)OFF3}$ corresponding to each patch $S_{(u,v)1}$, $S_{(u,v)2}$, and $S_{(u,v)3}$ whereby each patch $S_{(u,v)1}$, $S_{(u,v)2}$, and $S_{(u,v)3}$ is milled.

At the same time, while the tool is moved on the basis of the offset surface data $S_{(u,v)OFF1}$, $S_{(u,v)OFF2}$, or $S_{(u,v)OFF3}$ of the first, second, and third patches $S_{(u,v)1}$, $S_{(u,v)2}$, and $S_{(u,v)3}$, the tool mills the target surface described by the offset surface data for the patches passing through the common boundaries COM12, COM23, and COM31. At this time, as described above with reference to FIG. 6, the discontinuous spaces SPCI, SPC$_2$, and SPC$_3$ are generated because of non-continuity of the osculating planes between the adjoining patches. The positional data of the points $Q_{(0)12}$ to $Q_{(5)12}$, $Q_{(0)23}$ to $Q_{(5)23}$, $Q_{(0)31}$ to $Q_{(5)31}$, are interpolated as the offset surface data. Consequently, the object to be milled by means of the machining tool can be smoothly milled using the free surface represented by the data for the first, second and third patches $S_{(u,v)1}$, $S_{(u,v)2}$, and $S_{(u,v)3}$ and the interpolated offset surface data $Q_{(0)12}$ to $Q_{(5)12}$, $Q_{(0)23}$ to $Q_{(5)23}$, and $Q_{(0)31}$ to $Q_{(5)31}$.

Thus, a tool path can be generated wherein the tool blade edge is prevented from unnecessarily milling the target surface.

(G2) Interpolation of the Discontinuous Space SPC$_{123}$

The CPU calculates data for the discontinuous space SPC$_{123}$ of the corner part generated between the data for the common points of the three patches $S_{(u,v)1}$, $S_{(u,v)2}$, and $S_{(u,v)3}$ and the three offset surface data $S_{(u,v)OFF1}$, $S_{(u,v)OFF2}$, and $S_{(u,v)OFF3}$ in the following procedure.

The operator, in a step SP124, operates the CPU to display the surface data for the generated three patches $S_{(u,v)1}$, $S_{(u,v)2}$, and $S_{(u,v)3}$ on a screen of a display unit (not shown). After the visual inspection of the corner common point $P_{(0)123}$ to be interpolated, the operator designates data representing a discontinuous end surface of the offset surface data $S_{(u,v)OFF1}$, $S_{(u,v)OFF2}$, and $S_{(u,v)OFF3}$ around the common point $P_{(0)123}$.

The CPU, at step 126, in response to the designation of the data, derives the normal line vector $n_{(01)123}$, $n_{(02)123}$, and $n_{(03)123}$ at the points $P_{(01)123}$, $P_{(02)123}$, and $P_{(03)123}$ on the basis of the data for the points $P_{(01)123}$, $P_{(02)123}$, and $P_{(03)123}$.

These normal line vectors $n_{(01)123}$, $n_{(02)123}$, and $n_{(03)123}$ represent the height and gradient of the three discontinuous end surfaces with the common point $P_{(0)123}$ of the discontinuous space SPC$_{123}$ as a center, i.e., the three discontinuous end surfaces expressed as $P_{(0)123}$—$Q_{(0)12}$—$P_{(02)123}$—$P_{(0)123}$, $P_{(0)123}$—$P_{(02)123}$—$Q_{(0)23}P_{(03)123}$—$P_{(0)123}$—$P_{(03)123}$—$Q_{(0)31}$—$P_{(01)123}$—$P_{(0)123}$, by means of the normal line vectors $n_{(01)123}$, $n_{(02)123}$ and $n_{(03)123}$ since the points $P_{(01)123}$, $P_{(02)123}$, and $P_{(03)123}$ generate on an extension line from the vector represented by translation quantity data $Rxn_{(0,0)1}$, $Rxn_{(0,0)2}$ and $Rxn_{(0,0)3}$ expressed in the second terms of the equations (8), (9) and (10).

Next, the CPU, in a step SP128, derives an intersection $R_{123}$ of planes $\pi_{(01)123}$, $\pi_{(02)123}$, and $\pi_{(03)123}$ on the normal line Vectors $n_{(01)123}$, $n_{(02)123}$, and $n_{(03)123}$.

The planes $\pi_{(01)123}$, $\pi_{(02)123}$, and $\pi_{(02)123}$ of the normal line vectors $n_{(01)123}$, $n_{(02)123}$, and $n_{(03)123}$—*form planes normal to the normal line vectors* $n_{(01)123}$, $n_{(02)123}$, and $n_{(03)123}$ at the points $P_{(01)123}$, $p_{(02)123}$, and $P_{(03)123}$. When the three planes $\pi_{(01)123}$, $\pi_{(02)123}$, intersection point $R_{123}$ common to these three planes can be identified.

Figure 16:
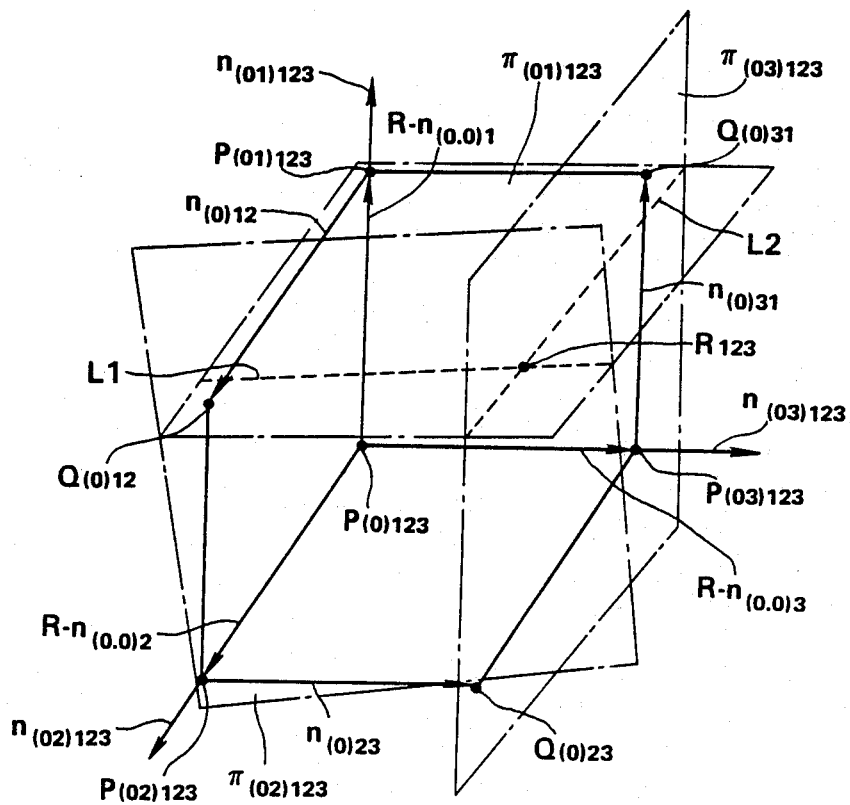
FIG. 16 is a schematic diagram for explaining a procedure for generating interpolation data for a discontinuous space in a corner of the offset surface.

That is to say, the point at which the planes $\pi_{(01)123}$ and $\pi_{(02)123}$ intersect lies on a straight line denoted by a broken line L1 in FIG. 16. In addition, an intersection point of planes $\pi_{(03)123}$ and $\pi_{(01)123}$ is present on the straight line denoted by a broken line L2. Hence, if the intersection $R_{123}$ of the straight lines L1 and L2 is derived, only a single intersection $R_{123}$ common to the three planes $\pi_{(01)123}$, $\pi_{(02)123}$, and $\pi_{(03)123}$ can be identified.

Next, the CPU, in a step SP130, interpolates the positional data for the intersection $R_{123}$ as the offset surface data for the discontinuous space SPC$_{123}$ generated at the corner. Thereafter, the CPU ends the program in the step SP132.

In this way, when the discontinuous space SPC123 is generated on the corner from among the offset surface data used when the free surface is milled and in which the three patches $S_{(u,v)1}$, $S_{(u,v)2}$, and $S_{(u,v)3}$ are mutually adjoined and connected where there is no continuity of the osculating planes, the intersection $R_{123}$ of FIG. 16 is used as the interpolation data for milling so the corner part represented by the position of point $P_{(0)123}$ is not excessively milled.

When, e.g., the tool milling the first patch $S_{(u,v)1}$ is moved across the discontinuous space SPC$_{123}$, the tool blade edge arrives at the point $P_{(01)123}$ of the corner. At this time, the center position of the tool is moved to the position $R_{123}$ so that the tool blade edge is separated from the point $P_{(0)123}$.

Thereafter, when the center of the tool is moved to the point $P_{(02)123}$ (or $P_{(03)123}$) of the second (or third) patch $S_{(u,v)2}$ (or $S_{(u,v)3}$), the tool blade edge again contacts the point $P_{(02)123}$ and thereafter mills the patch $S_{(u,v)2}$ (or $S_{(u,v)3}$).

As described hereinabove, according to the present invention, to mill an object having a free surface represented by a plurality of patches interconnected with no continuity of the osculating planes, the offset surface data representing the movement trajectory of the tool (tool path) of the machine is first generated. Then for the position of the common boundary at which there is no continuity of the osculating planes, the offset surface data representing the movement points of the tool is interpolated so that the object represented by the free surface is not excessively milled.

Although the present invention has been shown and described with respect to preferred embodiments, various changes and modifications which are obvious to a person skilled in the art to which the invention pertains are deemed to lie within the spirit and scope of the invention.

What is claimed is:

1. A method for defining a path on a target surface for a milling tool having a blade by generating offset surface data using a free surface formed with at least two patches sequentially interconnected at a boundary line where there is non-continuity of the osculating planes, the method comprising the steps of:

(a) generating first surface data representing a first offset surface opposing the patches and second surface data representing a second offset surface formed at a position separated by a first predetermined distance from a position on the boundary line of the patches; and (b) interpolating the second surface data for the first surface data so that when the tool traverses the boundary line, a tool path can be generated wherein the tool blade edge is prevented from unnecessarily milling the target surface.

2. The method as recited in claim 1, wherein the second offset surface is a tubular surface having a predetermined radius with the boundary line as a center axis.

3. The method as recited in claim 1, wherein there are additionally sharp corner surfaces at the ends of the boundary line, and wherein the method further comprises the steps of: (c) generating third surface data representing a third offset surface formed at a position separated by a second predetermined distance from a sharp corner on the ends of the boundary line of the patches; and (d) interpolating the second and third data for the first surface data so that when the tool traverses the boundary line and the sharp corner, the tool path is defined so that the tool does not excessively mill the target.

4. The method as recited in claim 3, wherein the third offset surface is a spherical surface having a predetermined radius with the sharp corner present on one end of the boundary line as a center.

5. A method for defining a path on a target surface for a milling tool having a blade by generating offset surface data using a free surface formed with at least two patches sequentially interconnected at a boundary line where there is non-continuity of the osculating planes and there is a first discontinuous end surface represented by first offset surface data corresponding to a first one of the patches at each control point representing a common boundary of the first one of the patches and a second one of the patches, wherein the method comprises the steps of:
  (a) deriving an outwardly directed first vector normal to the first discontinuous end surface and simultaneously deriving a second vector comprising a normal line vector represented by second offset surface data corresponding to the second one of the patches; and
  (b) deriving a position of intersection between a plane of the second vector and the first vector so that the intersection position data is interpolated as a third offset surface data at a discontinuous space generated between the first and second offset surface data.

6. A method for defining a path on a target surface for a milling tool having a blade by generating offset surface data using a free surface formed with at least three patches interconnected in pairs at separate boundary lines where there is non-continuity of the osculating planes, the method comprising the steps of:
  (a) generating first surface data representing a first offset surface opposing one of the patches of a first pair of the patches and second surface data representing a second offset surface formed at a position separated by a first predetermined distance from a position on the boundary line of the first pair of the patches;
  (b) interpolating the second surface data for the first surface data so that when the tool traverses the boundary line between the first pair of the patches, a tool path can be generated wherein the tool blade edge is prevented from unnecessarily milling the target surface; and
  (c) repeating steps (a) and (b) for each of the other pairs of patches.

7. The method as recited in claim 6, wherein the second offset surface is a tubular surface having a predetermined radius with the boundary line as a center axis.

8. The method as recited in claim 6, wherein there are additionally sharp corner surfaces at the ends of the boundary lines, and wherein the method further comprises the steps of:
  (d) generating third surface data representing a third offset surface formed at a position separated by a second predetermined distance from a sharp corner among corners present on the ends of the boundary lines of the patches;
  (e) interpolating the second and third data for the first surface data so that when the tool traverses the boundary line and the sharp corner, the tool path is defined so that the tool does not excessively mill the target; and
  (f) repeating steps (d) and (e) for each sharp corner.

9. The method as recited in claim 8, wherein the third offset surface is a spherical surface having a predetermined radius with the sharp corner present on one end of the boundary line as a center.

10. A method for defining a path on a target surface for a milling tool having a blade by generating first second and third offset surface data using a free surface formed with at least first, second, and third patches as a target to be milled, the patches being sequentially interconnected at boundary lines where there is non-continuity of the osculating planes, the method comprising the steps of:
  (a) deriving first, second, and third normal line vectors on points corresponding to common points to the first, second, and third offset surface data of points corresponding to the mutually connected first, second, and third patches;
  (b) deriving an intersection of the planes of the first, second, and third normal line vectors;
  (c) interpolating the position data for the intersection as the offset surface data at a discontinuous space generated at the corner.

* * * * *